June 18, 1968   J. M. COTTINGHAM ET AL   3,389,403
LASER BEAM RECORDER WITH MEANS TO COMPENSATE FOR
CHANGE IN ANGULAR VELOCITY OF SWEPT BEAM Filed Sept. 6, 1966   3 Sheets-Sheet 1

INVENTORS
ARNALDO ROLON
JERRY M. COTTINGHAM
BY
Russell E. Schloff

INVENTORS
ARNALDO ROLON
JERRY M. COTTINGHAM

June 18, 1968 J. M. COTTINGHAM ET AL 3,389,403
LASER BEAM RECORDER WITH MEANS TO COMPENSATE FOR
CHANGE IN ANGULAR VELOCITY OF SWEPT BEAM
Filed Sept. 6, 1966 3 Sheets-Sheet 3

INVENTOR.
ARNALDO ROLON
JERRY M. COTTINGHAM
BY 3,389,403
LASER BEAM RECORDER WITH MEANS TO
COMPENSATE FOR CHANGE IN ANGULAR
VELOCITY OF SWEPT BEAM
Jerry M. Cottingham and Arnaldo Rolon, Houston, Tex.,
assignors to Dresser Industries, Inc., Dallas, Tex., a
corporation of Delaware
Filed Sept. 6, 1966, Ser. No. 577,259
7 Claims. (Cl. 346—108)

ABSTRACT OF THE DISCLOSURE

A modulated laser beam is swept across a flat film by a rotating mirror. A magnetic memory drum integral with the rotating mirror provides compensation for changes in the angular velocity of the swept beam. In alternative embodiments, either a slotted bar or a fiber optical system provides such compensation.

---

Figure 1:
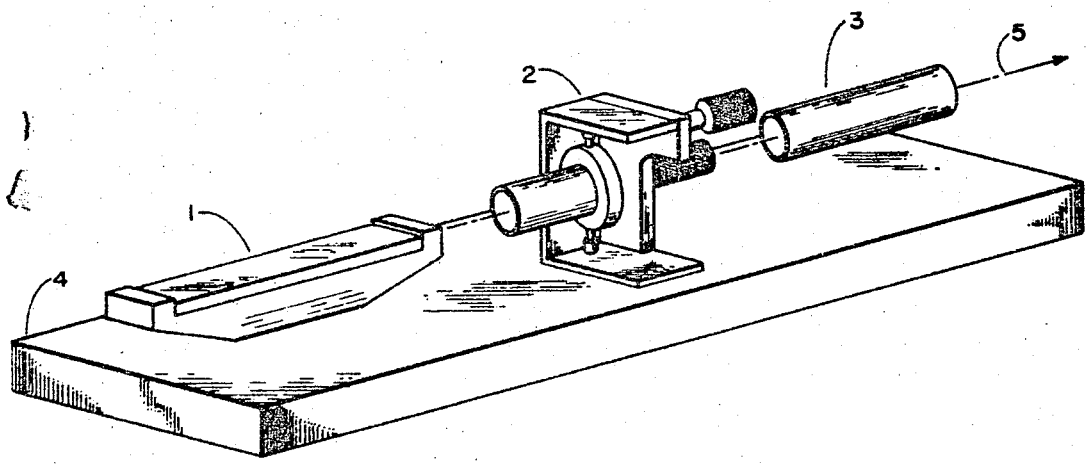

This invention relates to high speed data plotters. In particular, it relates to systems for transferring computer information to a photographic film, wherein a laser beam is controlled and subsequently deflected by a rotating mirror onto the film.

A high speed "on-line" plotter for use with digital computers is generally considered a necessity by those in the computer art. While the display of seismic information from a computer is one of the prime functions of the system according to the invention, a plotter designed for high speed seismic display from a digital computer also finds utilization for other displays, such as mechanical drawings, maps, and other graphic representations.

For general purpose use a plotter must be capable of placing a light beam on a sensitized film within some established tolerance. The presently accepted standard for the positional tolerance of a single dot, being the smallest mark that can be put on the film, is within approximately ±5 mils of the correct center. Thus, the resolution should be within 5 mils. As is well known in the art, the placement of a series or group of dots on a film produces almost any image.

A plotter should be capable of making variable density characters also. For example, a map oftentimes requires shading of varying gray levels. The prior art has accomplished this to some extent by varying the intensity of a cathode ray tube or by using a half tone or dot density technique.

Because of the extreme rapidity with which a digital computer operates, a digital plotter must be relatively fast. Moving ink pen x–y recorders, as sometimes used in the art, are an example of an extremely slow device for plotting computer output.

While the conventional CRT scanning process has been successful to some extent in rapid data plotting, it does have several disadvantages compared with the plotter according to the present invention, all of which will be discussed hereinafter.

It is therefore the primary object of this invention to provide a high speed, high resolution data plotter.

It is another object of the invention to provide a means for rapid data scanning.

It is yet another object of the invention to provide a data plotter having means for deflecting a laser beam across a film strip to establish with accuracy the position and resolution of the individual bits of data information thereon.

It is still another object of the invention to provide means for compensating for the non-linear effect of sweeping a flat surface with a light beam.

The objects of the invention are accomplished, broadly, by controlling a laser beam and deflecting the beam by a rotating mirror onto a film strip, while providing means for compensating for the difference in angular velocity of the laser beam while scanning the film strip. The laser beam is controlled by one or more pockel cells, the cells being controlled by data from a digital computer. After the laser beam has completed one scan across the film, the film is then stepped one position, approximately .005 inch, whereupon the laser unit makes its next scan across the film. Since the laser beam is controlled by the information from the digital computer and the associated circuitry according to the invention and because the laser beam is collimated, i.e., in the form of a pencil-like beam approximately .004 inch in diameter, a single scan of the laser beam produces a series of dots having 4 mil diameters across a longitudinal axis of the film. The location of the dots, being on 5 mil centers, is dependent upon the information from the computer and from the other information according to the invention.

Inherent in any system which utilizes a rotating scanning beam such as is used in this invention is the problem of the change in angular velocity of the beam, since the radius or distance from the mirror to the film is constantly changing. One of the features of this invention embodies means for circumventing the problem. This is done by providing timing information to the beam control circuitry which is independent of the changes in angular velocity.

Figure 2:
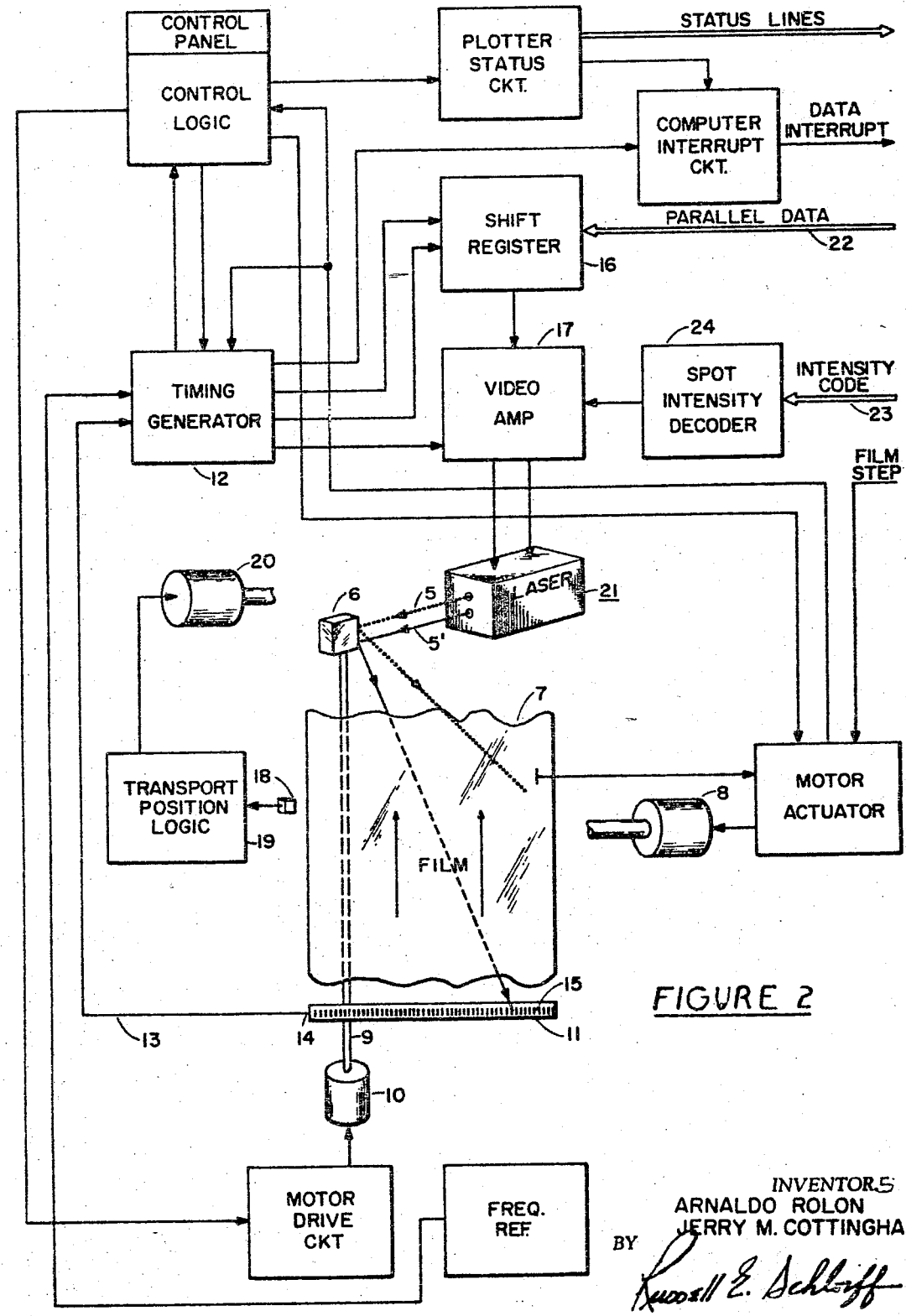
Figure 3:
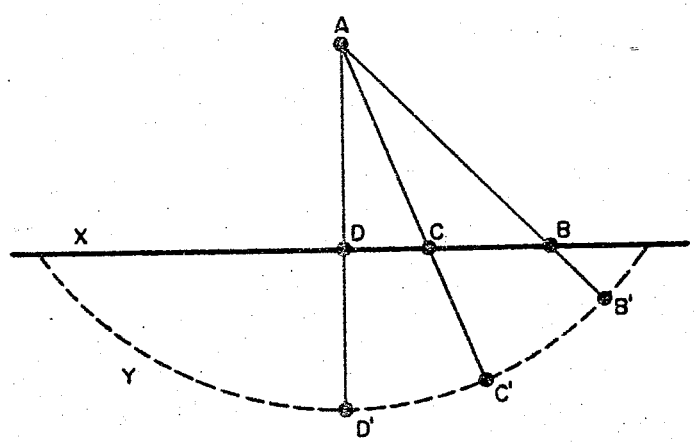
Figure 4:
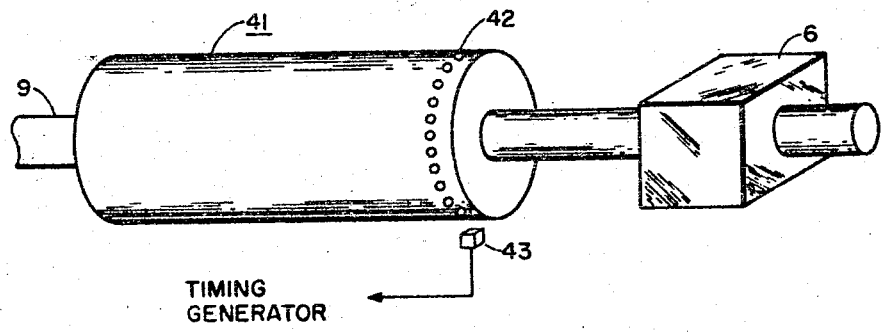

These and other objects, features, and advantages of the present invention will be apparent from the following detailed description taken with reference to the figures of the accompanying drawings, wherein the same or similar reference characters illustrate the same or similar parts;

FIGURE 1 of the drawings is a pictorial view of the laser assembly, pockel cell and lens housing according to the invention;

FIGURE 2 of the drawings is a pictorial view of the laser device, rotating mirror, and the film motor drive devices according to the invention. In addition, there is shown in block diagram the associated circuitry for driving and controlling the laser unit, the rotating mirror and the film mechanism;

FIGURE 3 is a schematic diagram of the non-linear effect of sweeping a flat surface with a rotating light source; and FIGURE 4 is a pictorial view of another embodiment of the invention having means for compensating for the non-linear effect of sweeping a flat film.

In the form of the present invention chosen for purposes of illustration in the drawings, FIGURE 1 shows a pictorial representation of the laser generating system 1 mounted on a granite block 4. The laser 1 is a continuous gas laser, model 170, operating at 6328 angstroms, commercially available from Optics Technology Incorporated, 901 California Ave., Palo Alto, Calif. The light beam 5, which emits from laser 1 has a collimated beam .080 inch in diameter, passes through a conventional pockel cell into the lens tube housing 3, the pockel cell having electrical connections (not illustrated) thereon whereby the cell can either completely block the beam 5 or lessen its intensity for varying shades of gray. The controlled beam 5, after passing through the pockel cell 2, proceeds from the conventional lens housing 3 in the form of a collimated, pencil-like beam of .004 inch in diameter. It should be appreciated that the diameter is variable for the particular purpose, and that the diameter is chosen for the spot diameter eventually appearing on the film 7. The collimated beam 5 is caused to impinge upon the four sided rotating mirror 6, the mirror being mounted on shaft 9 which is driven by the mirror drive motor 10. While the mirror 6 can have a number of sides other than four, a four sided mirror makes a complete revolution in .032 second when coupled through shaft 9 to the A.C. motor 10 operating at 1875 r.p.m. and in so doing, provides ease of illustration of the invention. The stepping motor 8 is synchronized with the rotating mirror so that one of the mirror flats causes the beam 5 to scan the film in .004 second; the film is advanced .005 inch during the next .004 second; and then the next mirror flat makes another scan of the film. Thus, in one complete revolution of the mirror 6, there are four lines of information from the beam 5 impinged upon the film 7. The film can be advanced at a faster pace, for example, 0.10 inch, during the .004 second stepping interval if less resolution is required in the film. The film 7 in the preferred embodiment is 42 inches wide, with a 40 inch scan being used thereon. Thus, eight thousand 5 mil center dots can be placed on a single scan of the film. It should be appreciated, however, that lesser or greater width films likewise find utility within the scope of the invention.

The film for the laser 1 specified is photo-sensitive, for example, Kodak Estarbase (Linagraph Recording Film). This film normally requires a developing process, but ultra-violet lasers are available which enable the use of "dry-write" film, requiring no development. Thus it should be appreciated that lasers having different wave lengths for use with other types of film are within the scope and intent of the invention.

Likewise, light sources other than lasers which have "laser-like" characteristics; viz., collimated beams, are within the scope of the invention, for example, argon tubes, etc. However, the laser beam is a part of the preferred embodiment.

FIGURE 3 illustrates in a schematic diagram the non-linear effect of sweeping a flat surface with a rotating light source. As is well-known, angular velocity is a vector comprised of both speed and direction, and is thus constantly changing, since the direction is always changing. For ease of demonstration, assume that a light source emanates from point "A" in the form of a rotating beam having a constant rotating speed. Were it not for the flat plane "X," the light would impinge upon the curved surface "Y," for example, at points D', C', and B'. While the distance from D' to C' is the same as from C' to B', and as such, represents equal time segments, the distance from D to C is shorter than from C to B. It should therefore be appreciated that the directional change portion of the angular velocity vector causes a non-linear effect when sweeping a flat surface.

Referring back to FIGURE 2, there is a means illustrated for compensating for the above described non-linear effect. This takes the form of a beam timing bar 11 having a series of evenly spaced slots 15 therein. Although not illustrated as such in FIGURE 1, FIGURE 2 illustrates the laser beam as having two components, a controlled beam 5 and a continuous beam 5'. As the controlled beam 5 is caused to be swept across the film by the mirror 6, beam 5' also is swept across the bar 11, passing through the slots 15. The light pulses from the beam 5' pass through the slots 15 down the length of the bar 11, where they impinge upon a photo diode 14, thus causing an electrical impulse to be passed down line 13 into the timing generator 12. Since the slots 15 are evenly spaced, the non-linear effect is eliminated and the change in angular velocity of the sweep thus becomes immaterial. A fiber optics system can be used as an alternative means for providing timing impulses to compensate for the non-linear effect herein described.

It should be appreciated that as the pulses from the bar 11, photo diode 14 and timing generator 12 enter the conventional shift register 16, they thereby gate the register 16 in such a manner that the computer information will pass through the video amplifier stage 17 and thus to laser unit 21. It should further be appreciated that even though the drive motor 10 rotates with varying degrees of consistency, the means thus illustrated and described, as well as the fiber optics system not illustrated, and also the memory drum system of FIGURE 4, provide a system whereby the light dots can be placed on the film 7 with extreme accuracy and linearity. Of course, if desired, the means described could be modified to produce non-linear spacing of the light information, such as, for example, having non-linear spacing of the slots 15 in the bar 11.

When a linear spacing of the light dots is desired, the system according to the invention operates as follows: if the computer indicates that a light dot should be available, the pulse for that dot remains ready in the shift register. To effect the proper positioning of the dot, a pulse from the compensation means and hence from the timing generator gates the shift register at the precise time to control the laser beam and thus position the dot. If the pulse from the timing generator arrives at the shift register and finds no dot information ready, the film will remain dark where the dot would otherwise appear. Using a linear spacing of the dots, any dots which thus appear on the film will be substantially even multiples of a given distance apart, "even" in this sense meaning whole or integral, as opposed to the fractional multiples of distances which would be present were it not for the compensation means according to the invention.

FIGURE 4 illustrates another means for generating the timing pulses to control the laser beam 5 according to a predetermined positional pattern. A magnetic memory drum 41, having a number of magnetic memory bits 42 mounted thereon, is mounted integrally with the mirror shaft 9 and mirror 6. Thus, the drum 41 and memory bits 42 rotate at the exact same frequency as does the mirror 6. As the memory bits 42, being determinably positioned and programmed in a conventional manner, rotate past a magnetic sensor 43, electrical pulses are sent to the timing generator 12 of FIGURE 2, which in turn gates the shift register 16 heretofore discussed. Although numerous and varied elaborate memory bit positioning arrangements could be illustrated and described, such are believed to be within the knowledge of the art. Suffice it to say, that the magnetic memory drum senses the rotation of the mirror 6 and causes pulses to trigger the timing generator, whereby a predetermined positioning of the light dots from the laser beam 5 is caused to be formed on the film 7, preferably being spaced an even number of distances apart.

Thus, there has been described three different means for compensating for the non-linear effect of sweeping or scanning a flat surface with a rotating light source. However, these are to be considered as merely exemplary and it is contemplated that other means will occur to one skilled in the art which are nonetheless considered within the scope of the invention.

Referring back to FIGURE 2, the motor actuator circuit, in conjunction with the film position stepping motor 8, the film tracking sensor 18, the transport position logic circuitry 19 and transport position motor 20 provides a means for stepping the film 7 at the completion of each scan of the film by the laser beam 5. However, if desired, the film could be stepped after more than one scan to provide additional information on the film or to provide a measure of redunancy.

The computer data is fed through the line 22 in parallel form into the shift register 16, which is gated by the timing generator 12, as discussed above. The shift register has a serial output of pulses which are fed into the video amplifier 17, the video amplifier also being connected to the timing generator.

Once the circuitry above described has decided that a given location on the film is to receive a light dot, the system must then decide upon the intensity or shade of gray. The intensity code, usually in digital form coming from a computer, is fed through line 23 into a digital-to-analog converter 24, identified in the drawings as a spot intensity decoder. Thus the different analog voltages which emerge from the converter 24 into the video amplifier 17 determine the intensity of the light spots which appear on the film 7.

What is claimed is:
1. A data plotter comprising
   (a) data receiving means;
   (b) a collimated light source;
   (c) means for controlling said source as a function of said data;
   (d) a flat surfaced light sensitive film responsive to said source;
   (e) a rotating mirror for deflecting said source, whereby said source can be scanned across said film; and
   (f) timing means providing compensation for changes in the angular velocity of said collimated light source as said source is scanned across said film, whereby said timing means cooperate with the data to provide selectively positioned exposure of the film.

2. The data plotter according to claim 1 wherein said selective positioned exposures are substantially even multiples of a given distance apart.

3. The data plotter according to claim 2 wherein said light source comprises a laser beam.

4. The data plotter according to claim 3 wherein said means for controlling said source comprises a pocket cell, whereby said source can be passed through said cell with varying degrees of intensity.

5. The data plotter according to claim 1, including in addition thereto, means for advancing said film along its longitudinal axis in timed relationship with said rotating mirror.

6. The data plotter according to claim 1 wherein said timing means comprises a bar with a plurality of slots of a predetermined position therein and a photo diode positioned at one end of said bar, whereby said source passes through said slots and activates said diode, thereby providing timing information to said means for controlling said source.

7. The data plotter according to claim 1 wherein said timing means comprises a magnetic memory drum integral with said rotating mirror.

References Cited
UNITED STATES PATENTS

| | | | |
|---|---|---|---|
| 3,154,371 | 10/1964 | Johnson | 346—108 |
| 3,287,736 | 11/1966 | Germer | 346—108 X |
| 3,299,434 | 1/1967 | McNaney | 346—110 |
| 3,314,073 | 4/1967 | Becker | 346—76 |
| 3,325,819 | 6/1967 | Fraser | 346—76 |

RICHARD B. WILKINSON, *Primary Examiner.*

JOSEPH W. HARTARY, *Assistant Examiner.*